United States Patent
Sugihara (10) Patent No.: US 7,869,929 B2
(45) Date of Patent: Jan. 11, 2011

(54) INTERNAL COMBUSTION ENGINE HAVING VARIABLE VALVE LIFT MECHANISM

(75) Inventor: Shinichi Sugihara, Higashi-hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 291 days.

(21) Appl. No.: 12/100,292

(22) Filed: Apr. 9, 2008

(65) Prior Publication Data
US 2008/0255752 A1 Oct. 16, 2008

(30) Foreign Application Priority Data
Apr. 13, 2007 (JP) ............... 2007-106321

(51) Int. Cl.
*F02D 41/00* (2006.01)
*F02D 41/06* (2006.01)

(52) U.S. Cl. .................... 701/103; 123/179.18
(58) Field of Classification Search ............ 123/179.18; 701/103
See application file for complete search history.

(56) References Cited

U.S. PATENT DOCUMENTS

| 6,394,051 | B1 * | 5/2002 | Filipe et al. ............ 123/90.15 |
| 6,651,601 | B2 * | 11/2003 | Sun et al. ............... 123/179.16 |
| 6,732,682 | B2 * | 5/2004 | Aoyama et al. .......... 123/48 B |
| 6,830,020 | B1 * | 12/2004 | El Tahry et al. .......... 123/90.15 |
| 7,267,104 | B2 * | 9/2007 | Watanabe et al. ....... 123/406.45 |
| 2002/0038646 | A1 * | 4/2002 | Nishimura et al. ...... 123/339.11 |
| 2003/0182931 | A1 * | 10/2003 | Sonoda et al. .......... 123/90.15 |
| 2003/0183185 | A1 * | 10/2003 | Sun et al. ............... 123/179.16 |
| 2005/0056242 | A1 * | 3/2005 | Murata et al. ........... 123/90.15 |
| 2005/0139183 | A1 | 6/2005 | Nohara et al. |
| 2006/0102127 | A1 * | 5/2006 | Izumi et al. ............ 123/179.18 |
| 2006/0288983 | A1 * | 12/2006 | Watanabe et al. ....... 123/406.45 |
| 2008/0178827 | A1 * | 7/2008 | Ervin et al. ............. 123/90.11 |

FOREIGN PATENT DOCUMENTS

| JP | 2001-159348 | 6/2001 |
| JP | 2005-325816 | 11/2005 |

* cited by examiner

*Primary Examiner*—Stephen K Cronin
*Assistant Examiner*—Arnold Castro
(74) *Attorney, Agent, or Firm*—Alleman Hall McCoy Russell & Tuttle LLP (57) ABSTRACT

Methods and systems for controlling an internal combustion engine are provided. The method may include opening and closing an intake valve respectively at first opening and closing timings of a cylinder cycle during an engine start when a temperature of the internal combustion engine is below a predetermined temperature, and opening and closing the intake valve respectively at second opening and closing timings of a cylinder cycle during an engine start when a temperature of the internal combustion engine is above the predetermined temperature. The second closing timing may be later than the first closing timing and after a bottom dead center of an intake stroke of the cylinder cycle. The second opening timing may be earlier than the first opening timing, and a difference between the first and second closing timings may be greater than a difference between the first and second opening timings.

20 Claims, 8 Drawing Sheets

INTERNAL COMBUSTION ENGINE HAVING VARIABLE VALVE LIFT MECHANISM

BACKGROUND

The present description relates to an internal combustion engine, more specifically to an internal combustion engine having a variable valve lift mechanism.

A continuously variable valve lift (CVVL) system is known and presented, for example, in U.S. Patent Application Publication US2005/0139183A1. The CVVL system has a drive shaft, which is equivalent to a conventional camshaft driven by an engine crankshaft, a cam which oscillates and pushes the intake valve against a return spring to open it, and a link mechanism which converts the rotational movement of the drive shaft to the oscillating movement of the cam. The system also has an electric motor which actuates a control shaft. The conversion between the rotational and oscillating movements varies in dependence on an angular position of the control shaft. Therefore, by rotating the control shaft with the electric motor a valve lift characteristic may be controlled as desired. Generally, in a CVVL system, as a valve lift becomes greater, a valve opening timing advances and a valve closing timing retards.

When an internal combustion engine starts its operation in an engine warmed-up condition, temperatures inside the engine combustion chambers or cylinders increase. During engine cranking, a piston in the cylinder moves relatively slowly and air is inducted and stays longer in the cylinder. Therefore, the air is heated further over the course of the intake and compression strokes of a cylinder cycle. If a greater amount of air is charged into the cylinder, particularly, when a geometric compression/expansion ratio is greater for a greater efficiency of the engine, the air is compressed during the compression stroke and the cylinder air temperature may become too high to combust the air and fuel in an intended manner. An unintended manner of combustion may include, for example, pre-ignition and knocking. These may lead to quality or reliability issues of the engine.

In the '183 publication, at the beginning of an engine cranking, the intake valve lift is minimum and the intake valve closes before an intake bottom dead center of a cylinder cycle. After some period has passed while cranking the engine, the intake valve lift is increased and the intake valve closes around the intake bottom dead center. Since the intake valve closes substantially before the intake bottom dead center at the beginning of the engine cranking, the cylinder air charge at the intake or compression bottom dead center is reduced and the cylinder air temperature during the compression stroke may decrease to some extent. However, there may still be a need to decrease the cylinder air temperature at the beginning of engine cranking, for example, in a case where an engine has a greater compression ratio and it is in a warmed-up condition.

SUMMARY

Accordingly, there is provided, in a first aspect of the present description, a method of controlling an internal combustion engine having an intake valve capable of shutting off a cylinder from an intake air passage of the internal combustion engine. The method comprises opening and closing the intake valve respectively at first opening and closing timings of a cylinder cycle during an engine start when a temperature of the internal combustion engine is below a predetermined temperature, and opening and closing the intake valve respectively at second opening and closing timings of a cylinder cycle during an engine start when a temperature of the internal combustion engine is above the predetermined temperature. The second closing timing is later than the first closing timing and after a bottom dead center of an intake stroke of the cylinder cycle; the second opening timing is earlier than the first opening timing; and a difference between the first and second closing timings is greater than a difference between the first and second opening timings.

In accordance with the first aspect, when the engine temperature is above the predetermined temperature, by closing the intake valve at the second closing timing which is after the bottom dead center, a portion of the air, which is inducted into the combustion chamber and which has been heated by the warmed-up engine components, flows back to the intake air passage through the open intake valve when the piston ascends in the cylinder. Then, a portion of the heat held in the air is released out of the combustion chamber. Therefore, the cylinder air temperature during the compression stroke may be appropriate for the air fuel mixture to be combusted in the intended manner, and this may improve quality of the engine.

Then, the second closing timing for the higher engine temperature above the predetermined temperature is later than the first closing timing for the lower engine temperature, and the second opening timing is earlier than the first opening timing. Therefore, the intake valve is staying open longer against the valve return spring when an engine temperature is above the predetermined temperature than when the engine temperature is below the predetermined temperature. Viscosity of engine lubricating oil and frictional loss of the engine moving parts are reduced as the engine temperature is greater, and this can compensate for increased power to keep the intake valve open longer. On the other hand, when the engine temperature is lower, the intake valve stays open for a shorter period of time and the power to operate the intake valve can be reduced. As a result, the engine operational efficiency can be maintained over the range of engine temperatures.

Further, since the difference between the first and second closing timings is greater than the difference between the first and second opening timings, the second opening timing may not advance far beyond the top dead center even if the second closing timing is substantially retarded. This causes a valve lift at the top dead center to be smaller, if any, and enables a piston head to be designed to be closer to the intake valve in the combustion chamber. As a result, a volume of the combustion chamber at the piston top dead center may decrease and result in a higher geometric compression/expansion ratio of the combustion chamber. The higher expansion ratio leads to a higher efficiency of the engine operation. Although the higher compression ratio increases the air temperature during the compression stroke, this can be lowered as described above.

Consequently, the first aspect of the description may improve the quality and operational efficiency of the internal combustion engine at the same time.

In some embodiments, the internal combustion engine may have a geometric compression ratio of 13:1 or higher for higher operational efficiency. A maximum lift of the intake valve may be greater with the second timings than with the first timings. As the temperature of the internal combustion engine is increased, the second closing timing may retard in the cylinder cycle. This may result in a greater temperature lowering effect. Further, the first opening timing may be after a top dead center of the intake stroke in the cylinder cycle.

In a second aspect of the present description, there is provided a method of controlling an engine system comprising an internal combustion engine having an intake air passage, a combustion chamber and an intake valve which reciprocally moves synchronously with a rotational phase of a crankshaft of the internal combustion engine, and thereby opens and closes the intake air passage to and from the combustion chamber, and a variable lift mechanism capable of varying a lift characteristic of the intake valve with respect to the rotational phase of the crankshaft. The method comprises controlling the variable valve lift mechanism so that the intake valve opens and closes, respectively, at first opening and closing timings of a cylinder cycle during an engine start when a temperature of the internal combustion engine is below a predetermined temperature, and controlling the variable valve lift mechanism so that the intake valve opens and closes respectively at second opening and closing timings of a cylinder cycle during an engine start when a temperature of the internal combustion engine is above the predetermined temperature. The second closing timing is later than the first closing timing, and after a bottom dead center of an intake stroke of the cylinder cycle, the second opening timing is earlier than the first opening timing, and a difference between the first and second closing timings is greater than a difference between the first and second opening timings.

In accordance with the second aspect as described above, the intake valve opens and closes during an engine start in the same manner as with the first aspect. Therefore, the second aspect may also improve the quality and operational efficiency of the internal combustion engine at the same time.

In some embodiments, before cranking the engine for a start, an electric motor of the variable valve lift mechanism may be driven. As a result, the combustion chamber may contain the desired amount of air charge from the beginning so as to start combustion of the air fuel mixture as soon as the engine cranking begins. This may result in a shorter period of time for the engine starting. And it may also reduce an amount of fresh air pumped out to an exhaust gas after-treatment system, whose oxygen storage capacity is needed for oxidizing remaining hydrocarbon and carbon monoxide in the exhaust gas. Therefore, it may improve the exhaust gas emission reduction that otherwise would be deteriorated with such fresh air.

In further embodiments, the engine system is equipped on a vehicle having an ignition switch operable by the vehicle operator or driver. The variable lift mechanism may be driven upon detecting an operation of the ignition switch such as inserting a key into a key cylinder of the ignition switch or turning the key. As a result, the variable lift mechanism enables the intake valve to operate in the desired manner from the beginning of the engine start.

In still further embodiments, the variable valve mechanism may be controlled during an engine stop so that a closing timing of the intake valve during an engine rotation is smallest. This may eliminate a need to drive the variable valve lift mechanism when the engine temperature is below a predetermined temperature. As a result, power to crank the engine may not be inadvertently affected.

DETAILED DESCRIPTION

Hereinafter, an embodiment of the present invention will be explained referring to the appended drawings.

Figure 1:
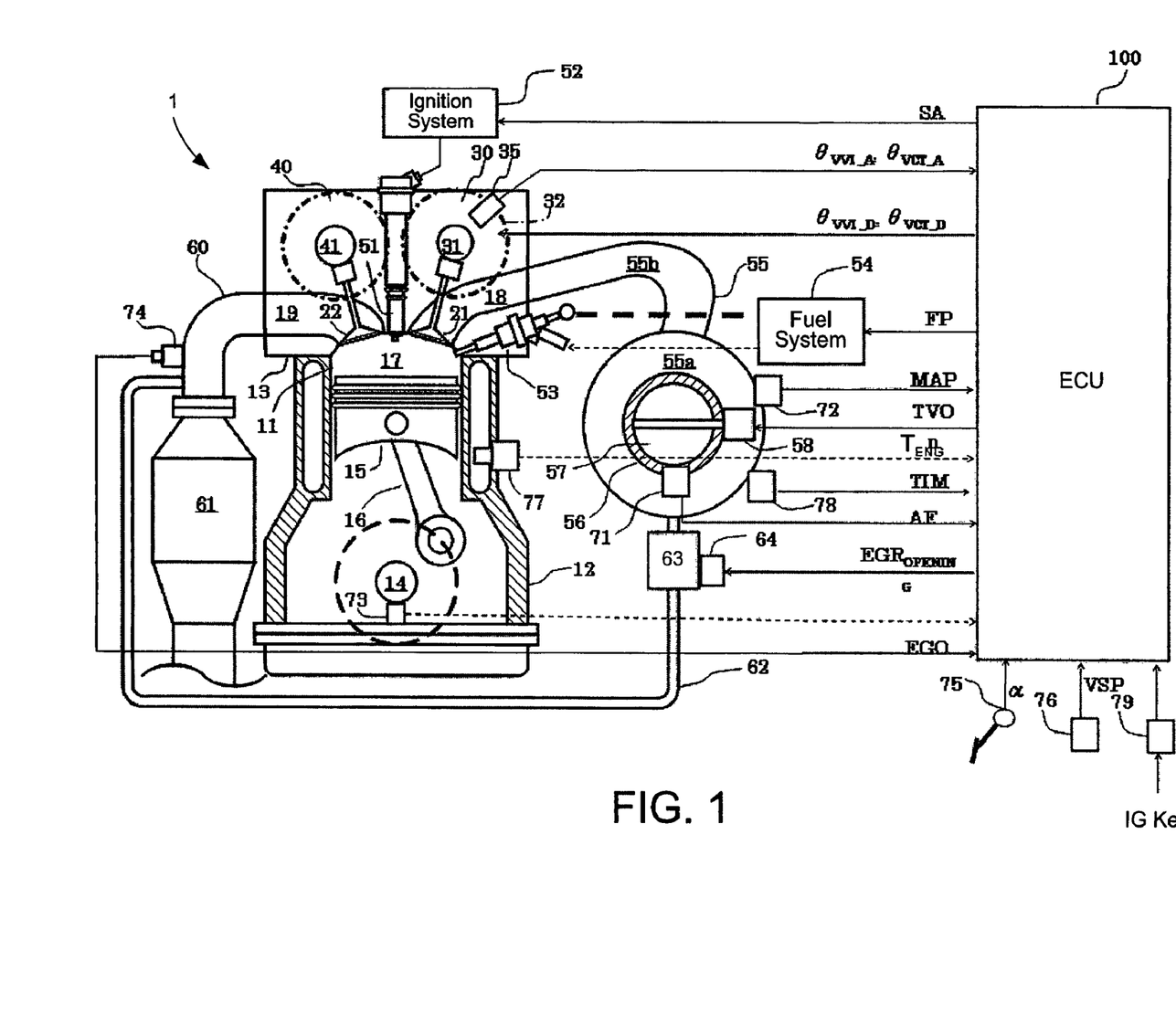
FIG. 1 is a schematic view of an engine system including an internal-combustion engine according to an embodiment of the invention.

FIG. 1 is a schematic diagram showing the entire configuration of an engine system to which the present invention is applied. The engine system includes an engine body 1 (i.e., an internal-combustion engine), and an electronic control unit or ECU (e.g., a controller) 100 for controlling various actuators associated with the engine body 1.

In this embodiment, the engine body 1 is a spark-ignition-type, four-stroke-cycle internal-combustion engine equipped on a vehicle, such as an automobile, and its output shaft is coupled to driving wheels through a drive system including a speed-reduction mechanism to propel the vehicle. The engine body 1 includes a cylinder block 12, and a cylinder head 13 mounted thereon. Two or more engine cylinders 11 are formed inside the cylinder block 12 and the cylinder head 13. In this embodiment, the engine body 1 is an inline four-cylinder engine and, thus, it is formed with four cylinders 11. Further, a crankshaft 14 is rotatably supported by the cylinder block 11 through journals, or bearings, etc.

In each cylinder 11, a piston 15 is slidably inserted, and a combustion chamber 17 is formed above the piston 15.

In this embodiment, the geometric compression ratio of the engine body 1 is set to approximately 14. The compression ratio represents a ratio of a volume of the combustion chamber 17 when the piston 15 is located at its bottom dead center, to a volume of the combustion chamber 17 when the piston 15 is located at its top dead center. Of course, the geometric compression ratio may not be limited to 14, and may be any other suitable ratio. For example, in order to improve efficiency of the engine, it may be desirable that the geometric compression ratio is higher. However, if the geometric compression ratio is too high, the temperature in the cylinders may become too high during the compression stroke, which may cause self-ignitions at unintended timings. Thus, the geometric compression ratio typically is preferable to be 13-16.

Two air-intake ports 18 and two exhaust ports 19 that communicate with each combustion chamber 17 are formed in the cylinder head 13. Further, the cylinder head 13 is provided with air-intake valves 21 for blocking the air-intake ports 18 from the combustion chambers 17, respectively, and exhaust valves 22 for blocking the exhaust ports 19 from the combustion chambers 17, respectively. In this embodiment, the double-overhead-cam-type with four valves having two air-intake valves 21 and two exhaust valves (not shown) for each cylinder 11 is employed. The air-intake valve 21 is driven by an air-intake valve drive mechanism (e.g., variable-valve-lift mechanism) 30 described later to open and close each air-intake port 18 at predetermined timings. Similarly, the exhaust valve 22 is driven by an exhaust valve drive mechanism 40 described later to open and close each exhaust port 19 at predetermined timings.

The air-intake valve drive mechanism 30 and the exhaust valve drive mechanism 40 include an air-intake cam shaft 31 and an exhaust cam shaft 41, respectively. The air-intake cam shaft 31 and the exhaust cam shaft 41 are coupled to the crankshaft 14 through a power-transmitting mechanism, such as a well-known chain-sprocket mechanism. Typically, the power transfer mechanism is configured so that the cam shafts 31 and 41 rotate once while the crankshaft 14 rotates twice.

The air-intake valve drive mechanism 30 includes a variable cam timing mechanism (hereinafter, simply referred to as a "VCT mechanism") 32, and connected with the crankshaft 14 through the chain drive mechanism so as to drive the crankshaft 14. Although it is not illustrated, the chain drive system includes a drive sprocket of the crankshaft 14 in addition to a driven sprocket 104 (see FIG. 2), and a chain wound around both the sprockets.

The VCT mechanism 32 includes a case fixed to the driven sprocket 104 so as to rotate therewith, and a rotor accommodated in the case and fixed to an inner shaft 105 (see FIG. 2) that constitutes the air-intake cam shaft 31 so as to rotate therewith. Between the case and the rotor, two or more fluid- or liquid-pressure chambers are formed around a rotational axis X (shown in FIGS. 3A and 3B) in a circle (that is, in the circumferential direction). A pump (not illustrated) selectively supplies pressurized fluid or liquid (e.g., engine oil) into each of the fluid- or liquid-pressure chambers to generate a pressure difference between the opposing liquid-pressure chambers.

Figure 2:
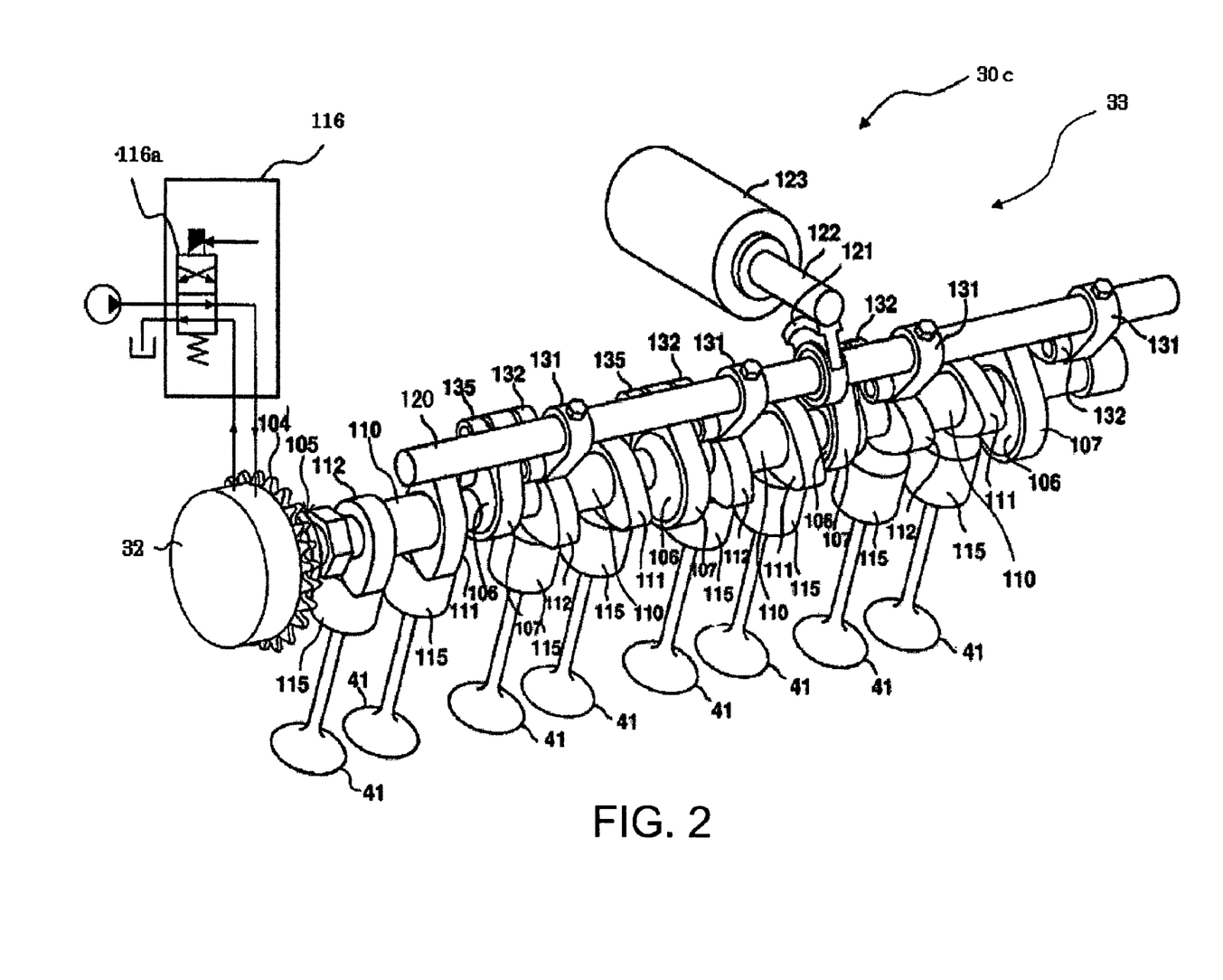
FIG. 2 is a schematic view of a variable-valve-lift mechanism of the engine shown in FIG. 1.

As shown in FIG. 2, the VCT mechanism 32 is controlled by a VCT control system 116. The VCT control system 116 includes a magnetic valve 116a, and in response to a control signal from ECU 100 (described in detail later), the magnetic valve 116a carries out a duty control of the liquid pressure to adjust a flow rate, pressure, or the like, of the fluid or liquid supplied into the liquid-pressure chamber. Accordingly, an actual phase difference between the sprocket 104 and the inner shaft 105 is varied, thereby achieving a desired rotational phase of the inner shaft 105, which may be well-known.

The inner shaft 105 includes disk-shaped cams 106 that are integrally provided with the inner shaft 105 at positions corresponding to the respective cylinders 11. The cams 106 are provided so as to be eccentric with respect to the axial center of the inner shaft 105, and rotate at a phase determined by the VCT mechanism 32. Each eccentric cam 106 is surrounded by a ring-shaped arm 107 so that the cam slidably rotates inside the arm. As may be clearer in FIGS. 3A and 3B, when the inner shaft 105 rotates about its axial center X, the ring-shaped arm 107 revolves about the same axial center X while rotating around the center of the eccentric cam 106.

Figure 3A:
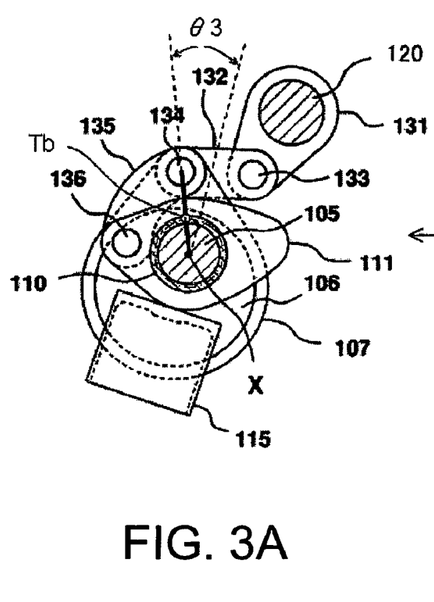
FIGS. 3A and 3B are schematic diagrams showing an operation of a valve-lift-varying device according to the embodiment.
Figure 3B:
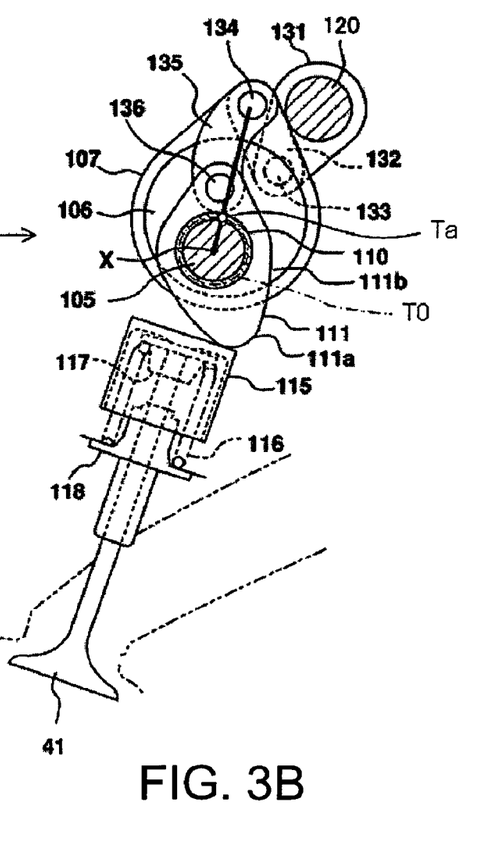

Further, rocker connectors 110 are provided to the inner shaft 105 at locations corresponding to the respective cylinders 11. The rocker connector 110 is formed in a cylindrical shape, and it is fitted onto the inner shaft 105 so as to be coaxially supported, that is, to be supported rotatable around the axial center X of the inner shaft 105. On the other hand, the outer circumferential surface of the rocker connector 110 is formed as a bearing journal, and is rotatably supported by a bearing cap (not shown) provided to the cylinder head 13.

First and second rocker cams 111 and 112 are integrally formed in the rocker connector 110. Because configurations of both are almost identical, only the rocker cam 111 will be described hereinafter referring to FIGS. 3A and 3B. The rocker cam 111 includes a cam surface 111a and a circular base surface 111b, each of which contacts an upper surface of the tappet 115. The rocker cam 111 pushes the tappet 115 to open the air-intake valve 21 similar to a conventional valve-operating mechanism, except that it swings without continuously rotating. As such, the VCT mechanism 32 changes a valve timing of the air-intake valve 21 (valve-open timing and valve-close timing) through the rocker connector 110 by changing the rotational phase of the inner shaft 105 with respect to the crankshaft 14. The tappet 115 is supported by a valve spring 116, and the valve spring 116 is supported between the retainers 117 and 118 as is well known in the art.

The air-intake valve drive mechanism 30 includes a variable-valve-lift mechanism (which may also be referred to as a "lift variable mechanism," and hereinafter, simply referred to as a "VVL") 33 that comprises a control shaft 120 and an assembly of the inner shaft 105 and the rocker cam components 110-112.

The control shaft 120 is rotatably supported by bearings (not illustrated), and as shown in FIG. 2, a worm gear 121 is integrally and coaxially provided in proximity to the center of the control shaft 120 in the longitudinal direction so as to protrude from an outer circumferential surface thereof.

The worm gear 121 engages with worm 122, and the worm 122 is fixed to an output shaft of a stepping motor 123, for example. Therefore, when the stepping motor 123 is actuated in response the control signal received from ECU 100, the motor can rotate the control shaft 120 through the worm 122 and the worm gear 121 to a desired position. As such, control arms 131 are attached to the control shaft 120 at locations corresponding to the respective cylinders 11, and these control arms 131 are integrally rotated by the rotation of the control shaft 120.

As shown in FIGS. 3A and 3B, the control arm 131 is coupled to the ring-shaped arm 107 with the control link 132. More specifically, one end portion of the control link 132 is rotatably coupled to a tip-end portion of the control arm 131 with a control pivot 133, and the other end portion of the control link 132 is rotatably coupled to the ring-shaped arm 107 with a common pivot 134.

In this embodiment, the common pivot 134 couples the other end portion of the control link 132 to the ring-shaped arm 107 as described above, while the other end portion of the control link 132 is rotatably coupled to one end portion of the rocker link 135 so as to penetrate the ring-shaped arm 107. Further, the other end portion of the rocker link 135 is rotatably coupled to the rocker cam 111 with a rocker pivot 136, and thereby rotation of the ring-shaped arm 107 is transmitted to the rocker cam 111.

More specifically, when the inner shaft 105 rotates and the eccentric cam 106 integrally rotates therewith, if the eccentric cam 106 is located at the bottom as shown in FIG. 3A, the ring-shaped arm 107 is also located at the bottom. On the other hand, if the eccentric cam 106 is located at the top as shown in FIG. 3B, the ring-shaped arm 107 is also located at the top.

In this embodiment, a position of the common pivot 134 that couples the ring-shaped arm 107 and the control link 132 together is defined by a spatial relationship of three components, a position of the control pivot 133, and a common center position of the eccentric cam 106 and the ring-shaped arm 107. Thus, as shown in FIGS. 3A and 3B, assuming that the position of the control pivot 133 does not change (that is, the control shaft 120 does not rotate), the common pivot 134 reciprocates approximately in the vertical direction only corresponding to the rotation of the eccentric cam 106 and the ring-shaped arm 107 around the common center.

The reciprocating movement of the common pivot 134 is transmitted to the first rocker cam 111 by the rocker link 135 to swing or pivot the first rocker cam 111 around the axial center X together with the second rocker cam 112 coupled therewith through the rocker connector 110. As such, when the cam surface 111a of the rocker cam 111 contacts the upper surface of the tappet 115, the rocker cam 111 presses down the tappet 115, while resisting a spring force of the valve spring 116. Thus, when the tappet 115 is pressed down, the tappet 115 further depresses the air-intake valve 21 to open the air-intake port 18.

On the other hand, when the base surface 111b of the rocker cam 111 contacts the upper surface of the tappet 115, the tappet 115 will not be pressed down. This is because a radius of the base surface 111b of the rocker cam 111 centered on the axial center X is set less than an interval between the axial center X and the upper surface of the tappet 115.

Regarding the spatial relationship of the control pivot 133, the common pivot 134, and the common center of the eccentric cam 106 and the ring-shaped arm 107, as described above, when the position of the control pivot 133 changes, the spatial relationship of these components also changes. Accordingly, the common pivot 134 will reciprocate along a different locus from the above.

Thus, in this embodiment, the stepping motor 123 rotates the control shaft 120 and the control arm 131 to change the position of the control pivot 133, thereby changing a swing range of the rocker cams 111 and 112. For example, as the control arm 131 is rotated clockwise as shown in FIG. 3B to shift the control pivot 133 toward an upper and left direction from the position shown in FIG. 3A, the swing range of the rocker cam 111 will become such that tendency of the base surface 111b to contact the upper surface of the tappet 115 is relatively stronger and, thus, the valve lift amount becomes smaller.

When the control arm 131 is further rotated to greatly change the swing or pivot range of the rocker cam 111, only the base surface 111b of the rocker cam 111 contacts the upper surface of the tappet 115, thereby separating the cam surface 111 a from the upper surface of the tappet 115. Thus, in this case, the valve lift amount is zero.

As described above, the air-intake valve drive mechanism 30 of this embodiment can change the valve timing phase by the VCT mechanism 32 and the components associated therewith. In addition, the air-intake valve drive mechanism 30 can change the valve lift amount from zero to the maximum by the control of the stepping motor 123 of the VVL 33 and, thus, any combination of the open timing and close timing of the air-intake valve 21 may be possible.

In this embodiment, because the exhaust valve drive mechanism 40 includes a similar structure to the air-intake valve drive mechanism 30 as described above, the explanation of the exhaust valve drive mechanism 40 will be omitted herein.

Figure 4:
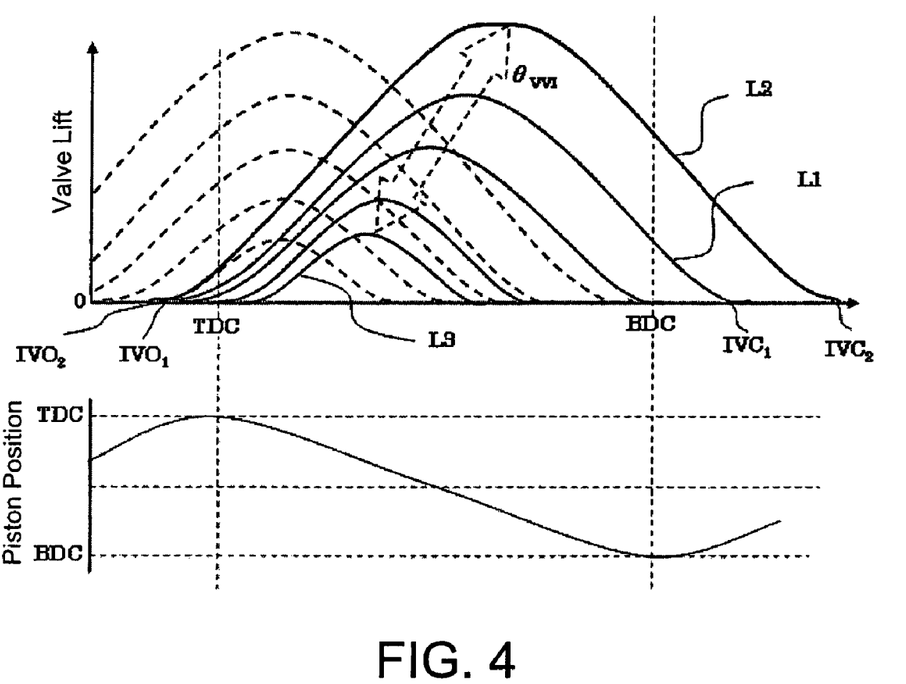
FIG. 4 is a graph showing a change in a valve-lift characteristic of the variable-valve-lift mechanism of the engine according to the embodiment.

FIG. 4 shows with solid lines lift curves of the air-intake valve 21 that is continuously changed from a large-lift control state to a small-lift control state by the operation of the VVL 33. In this graph, the lift curve L2 represents a large-lift control state, and L3 represents the small-lift control state. Further, in FIG. 4, a lift curve of conventional CVVL (where a lift-peak phase is almost non-variable) is shown with dashed lines.

As shown in FIG. 4, according to the VVL 33, a crank angle position at a lift peak advances as the lift stroke (i.e., the lift amount and operational angle) becomes smaller. As described above, this is because upon a transition from the large-lift control state to the small-lift control state, rotation of the control arm 131 moves the control link 132 to a position on the reverse side of rotation of the cam shaft 31 to move the course of the common pivot 134 to a position on the reverse side of rotation of the cam shaft 31. More specifically, in the large-lift control state, the center of the eccentric cam 106, when the air-intake valves 21 are in proximity to the lift peak positions, is shown in FIG. 3B at a point Ta. On the other hand, in the small-lift control state, the center position of the eccentric cam 106 in proximity to the lift peak moves to a point Tb, and the lift peaks of the air-intake valves 21 advance by an angle θ3 along the rotation locus or path T0.

As such, in the air-intake valve drive mechanism 30, because the lift peak timing advances as the lift stroke becomes smaller, the valve-open timing of the air-intake valve 21 changes less, even when the lift amount changes. Thus, the valve-open timing of the air-intake valve 21 almost stays in proximity to the compression top dead center (TDC) of the cylinder 11, and the valve-close timing of the air-intake valve 21, greatly changes as the lift amount changes. In other words, the valve-close timing of the air-intake valve 21 retards as the lift amount increases while the valve-open timing of the air-intake valve 21 advances. Further, the advance amount of the valve-open timing of the air-intake valve 21 becomes smaller compared with the retard amount of the valve-close timing of the air-intake valve 21.

On the other hand, for the lift curves of the conventional CVVL (where the lift-peak phase is almost non-variable) shown in FIG. 4 with dashed lines, if the idle lift is set so as to correspond to a required fuel consumption, when the lift setting is to greatly retard the valve-close timing, the valve-open timing advances by an amount equivalent to the retard of the valve-close timing. Therefore, there is a concern that too much advance of the valve-open timing may interfere with the piston. To inhibit the interference with the piston, the advance of the valve-open timing is limited and, thus, it is impossible to realize a sufficient retard of the valve-close timing while controlling the advance of the valve-open timing.

Returning to FIG. 1, the air-intake port 18 communicates with a surge tank 55a through an air-intake manifold 55. A throttle body 56 is provided in an intake air passage, located upstream of the surge tank 55a. A throttle valve 57 for adjusting or controlling an intake air flow rate toward the surge tank 55a from outside is rotatably provided inside the throttle body 56. The throttle valve 57 changes an opening area of the intake air passage (i.e., a passage area) to change the intake air flow rate, while changing a pressure inside the intake air passage downstream of the throttle valve 57. The throttle valve 57 is driven by the throttle actuator 58. The throttle actuator 58 drives the throttle valve 57 so that the valve opening of the throttle valve 57 reaches a throttle valve opening TVO calculated by ECU 100, as described later. In this embodiment, the intake air passage includes the air-intake port 18, the air-intake manifold 55, and the surge tank 55a, downstream of the throttle valve 57. In this embodiment, by adjusting the valve opening of the throttle valve 57 and the valve-close timing of the air-intake valve 21, an amount of air filled in the cylinder 11 is controlled to an appropriate value.

The exhaust port 19 communicates with an exhaust pipe through an exhaust manifold 60. An exhaust-gas-purification system is arranged in the exhaust pipe. The exhaust-gas-purification system may include, but not limited to, a catalytic converter 61, such as a three-way catalyst, a lean NOx catalyst, and an oxidation catalyst, for example.

The air-intake manifold 55 and the exhaust manifold 60 communicate with each other through an EGR pipe 62, and are configured so that a portion of the exhaust gas circulates to the air-intake side. An EGR valve 63 for adjusting a flow rate of the EGR gas that circulates to the air-intake side through the EGR pipe 62 is provided in the EGR pipe 62. The EGR valve 63 is driven by an EGR valve actuator 64. The EGR valve actuator 64 drives the EGR valve 63 so that the valve opening of the EGR valve 63 reaches an EGR opening $EGR_{OPEN}$ calculated by ECU 100 (described later), and thereby, adjusting or controlling the flow rate of the EGR gas to an appropriate value.

Spark plugs 51 are attached to the cylinder head 13 so that tip ends thereof oppose the respective combustion chambers 17. The spark plug 51 generates sparks in the combustion chamber 17 when it is supplied with electricity by the ignition system 52 based on a signal SA for the ignition timing calculated by the ECU 100, as described later.

Further, fuel injectors 53 for direct fuel injection into the respective combustion chambers 17 are attached to the cylinder head 13 so that tip ends thereof oppose the respective combustion chambers 17. In detail, the fuel injector 53 is arranged so that that the tip end thereof is located below the two air-intake ports 18 in the vertical direction, and is located at an intermediate position of the two air-intake ports 18 in the horizontal direction. The fuel injector 53 injects a predetermined amount of the fuel into the combustion chamber 17 when a solenoid provided therein is supplied with electricity by the fuel system 54 for a predetermined period of time based on a signal of a fuel injection amount FP calculated by ECU 100, as described later.

ECU 100 typically is a controller mainly including a well-known microcomputer having a CPU for executing a computer program, a memory having a RAM and/or ROM to store a computer program and data, and an I/O bus through which inputs and outputs of various signals are performed.

ECU 100 reads various types of signals through the I/O bus, which includes an engine coolant temperature $T_{ENG}$ detected by an engine temperature sensor 77, an air-intake amount AF detected by an air flow meter 71, an air-intake temperature TIM detected by an air-intake temperature sensor 78, an air pressure MAP inside the air-intake manifold 55 detected by an air-intake pressure sensor 72, a crank angle pulse signal detected by a crank angle sensor 73, an oxygen concentration EGO of the exhaust gas detected by the oxygen concentration sensor 74, a depression amount a of a gas pedal by a vehicle operator detected by an gas-pedal opening sensor 75, and a vehicle speed VSP detected by a vehicle speed sensor 76. Further, ECU 100 reads a position of an ignition key switch provided to the vehicle (hereinafter, referred to as an "IG key") detected by the sensor 79 provided inside a key cylinder into which the IG key is inserted. From the crank angle pulse signal, an engine speed $N_{ENG}$ of the engine 1 is calculated.

ECU 100 calculates instruction values to various actuators based on the respective inputs so that the air amount introduced into the cylinder 11 (i.e., the air filling amount inside the cylinder 11) or the ignition timing becomes an appropriate value according to the operating condition. For example, ECU 100 calculates the instruction values including the throttle valve opening TVO, the fuel injection amount FP, the ignition timing SA, the retard amount $\theta_{VCT}$ of the air-intake valve 21, the control value $\theta_{VVL}$ of the VVL 33, and the EGR opening $EGR_{OPEN}$, and then correspondingly outputs the calculated values to the throttle actuator 58, fuel system 54, ignition system 52, EGR valve actuator 64, VCT mechanism 32, and VVL 33.

Figure 5:
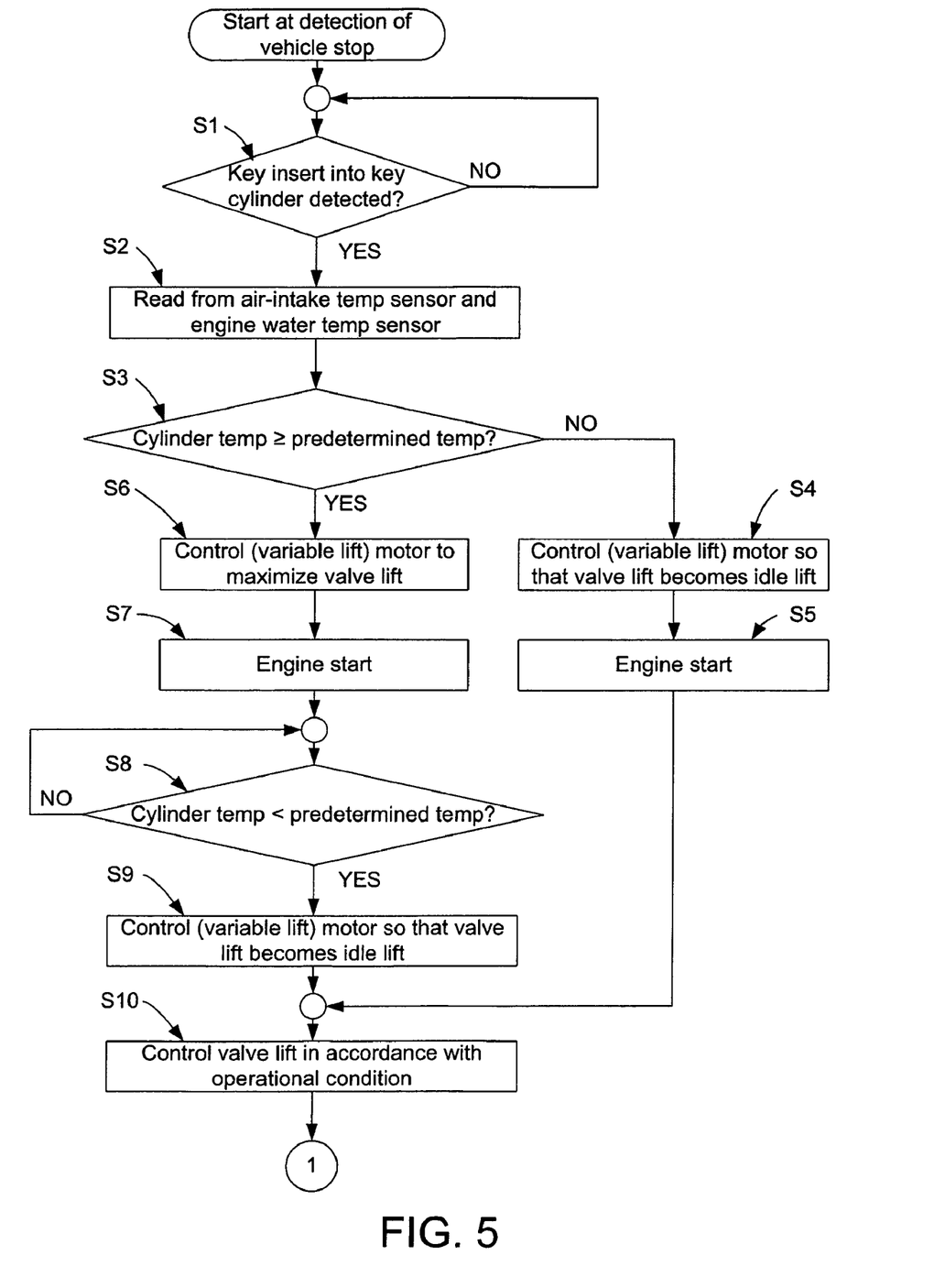
FIG. 5 shows a flowchart of a control routine according to the embodiment, together with FIG. 6.
Figure 6:
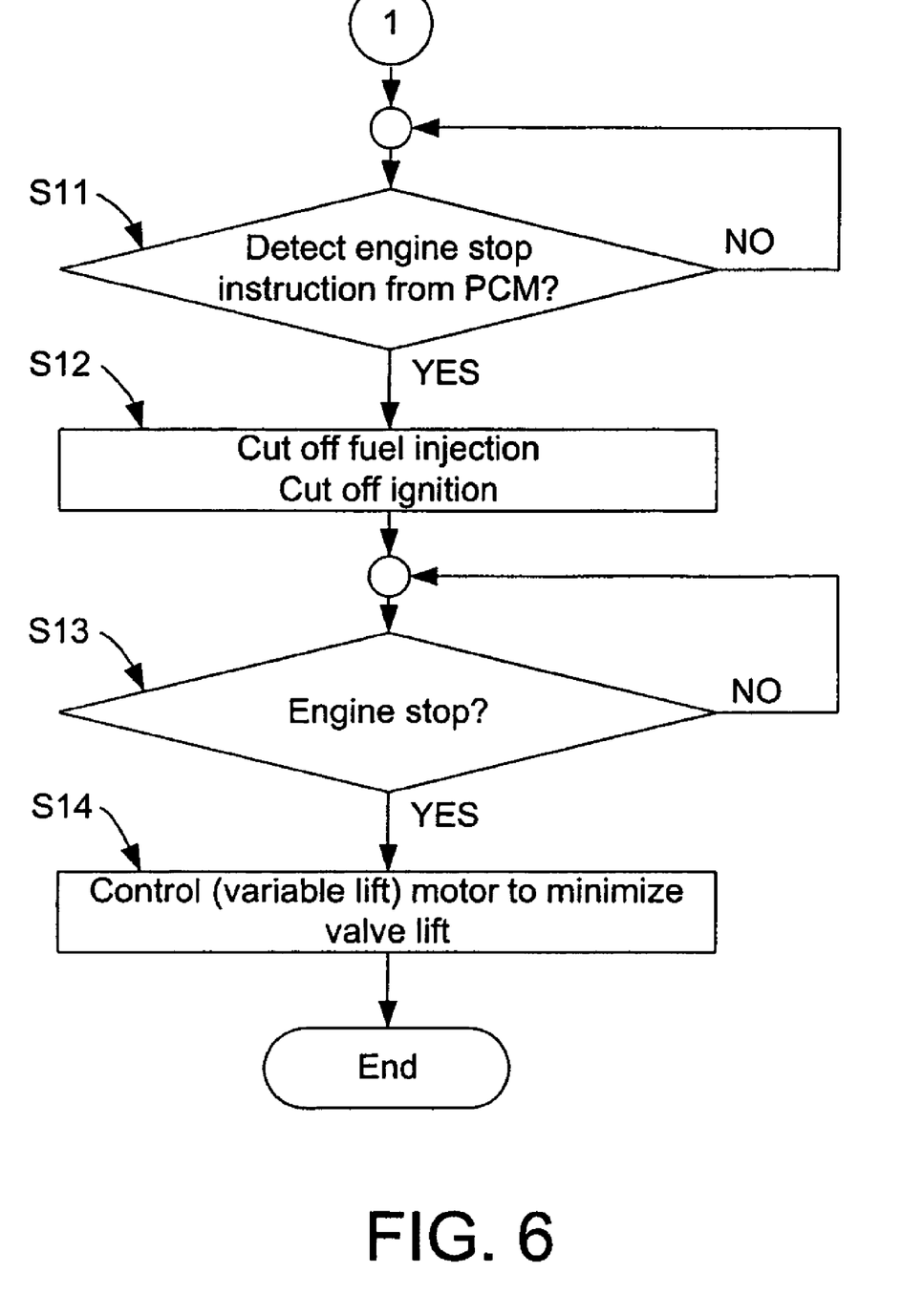
FIG. 6 shows a flowchart of the control routine according to the embodiment, together with FIG. 5.

A specific control routine of the program stored in ROM of ECU 100 will be explained using the flowchart of FIGS. 5-8. One example of the control routine will be explained as shown in the flowchart of FIGS. 5 and 6.

This routine starts when stop of the vehicle (e.g., engine stop) is detected. First, in Step S1, ECU 100 determines whether an insertion of the ignition key into the key cylinder (hereinafter referred to as "key insert") is detected, and if the key insert has not been detected, ECU 100 stands by until it detects the key insert.

If the key insert is detected, in Step S2, ECU 100 reads the detection values of the air-intake temperature sensor 78 and the engine temperature sensor 77. Then, in Step S3, ECU 100 determines based on the detection values of these sensors whether the temperature inside the cylinder is greater than a predetermined temperature (e.g., approximately 90 degrees C.).

If ECU 100 determines that the temperature inside the cylinder is less than the predetermined temperature, in Step S4, it then controls the variable lift motor 123 so that the valve lift of the air-intake valve becomes an idle lift that is predetermined to be a relatively smaller amount, in order to improve fuel consumption for normal engine start. Then, in Step S5, ECU 100 starts the engine in accordance with the key operation, and then in Step S10, it proceeds to a control for normal operation in which the valve lift is controlled according to an engine operating state, as described later.

On the other hand, in Step S3, if the temperature inside the cylinder is determined to be greater than the predetermined temperature, then, in Step S6, ECU 100 controls the variable lift motor 123 so that the valve lift of the air-intake valve reaches the maximum value, because a possibility of occurrence of pre-ignition is high. Then, in Step S7, ECU 100 starts the engine in accordance with the key operation.

Then, ECU 100 reads the detection values of the air-intake temperature sensor 78 and the engine temperature sensor 77, and in Step S8, it then determines whether the temperature inside the cylinder becomes less than the predetermined temperature. If the temperature is greater than the predetermined temperature, the routine stands by until the temperature becomes less than the predetermined temperature.

On the other hand, in Step S8, if the temperature inside the cylinder becomes less than the predetermined temperature, then, in Step S9, ECU 100 controls the variable lift motor 123 so that the valve lift of the air-intake valve becomes the idle lift, that is similar to the normal start for reducing fuel consumption, because the possibility of pre-ignition is low. Then, in Step S10, ECU 100 proceeds to the normal control in which the valve lift is controlled according to the engine operating state.

As such, when ECU 100 proceeds to the normal control, in Step S11, it then determines whether the engine stop instruction signal from ECU 100 is detected.

The routine stands by until the engine stop instruction signal is detected, and if the engine stop instruction signal is detected, in Step S12, ECU 100 then cuts off the fuel injection and ignition to stop the engine. Then, in Step S13, ECU 100 determines whether the engine is completely stopped. ECU 100 stands by until the complete engine stop, and if the engine is completely stopped, in Step S14, ECU 100 then controls the variable lift motor so that the valve lift of the air-intake valve reaches the minimum lift.

Figure 7:
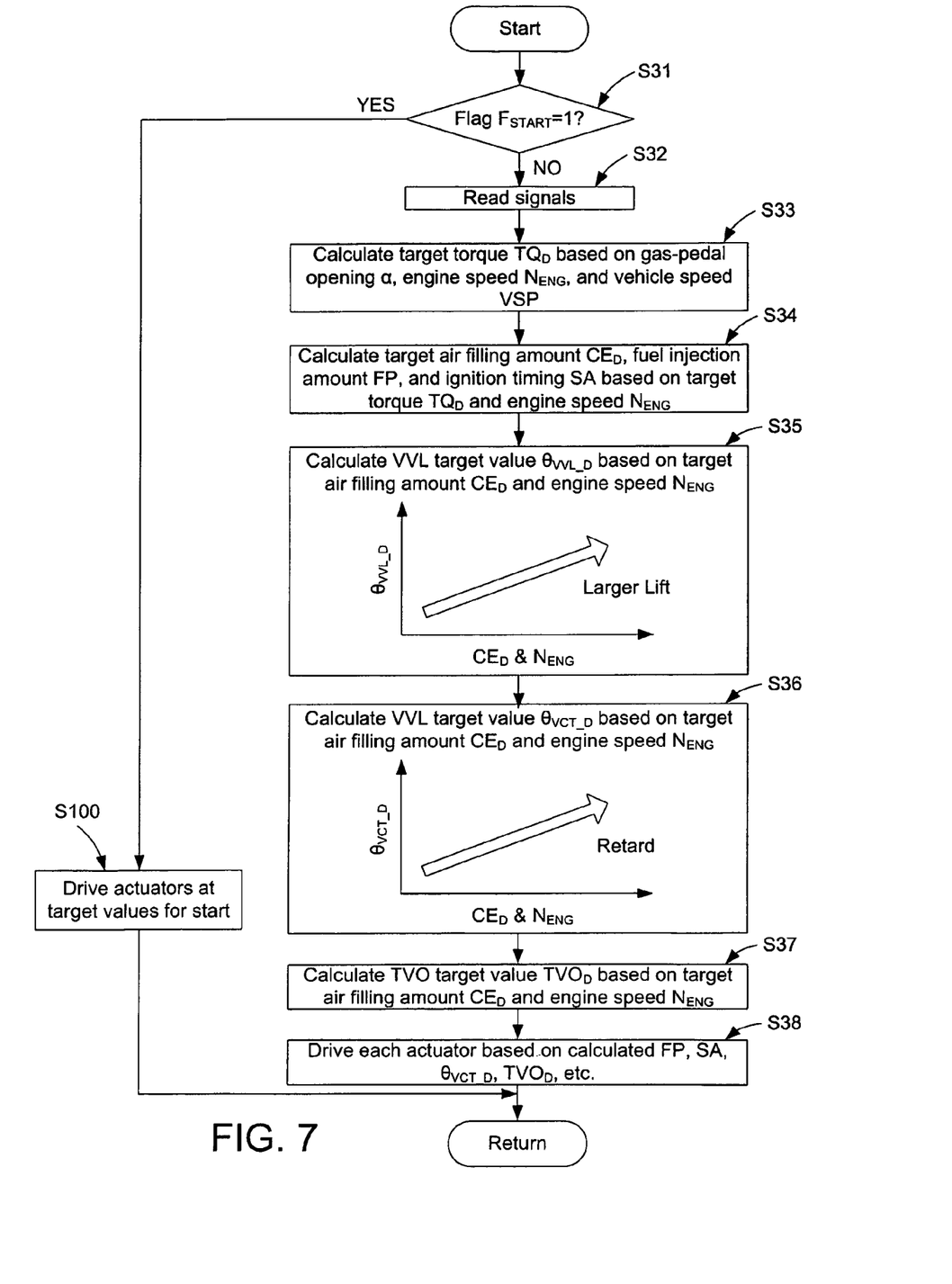
FIG. 7 is a flowchart showing the entire engine control routine according to a second embodiment of the invention.

Next, another control example will be explained referring to the flowcharts of FIGS. 7 and 8. The entire control routine of the engine 1 is shown in FIG. 7. First, in Step S31, ECU 100 determines whether a starting control flag $F_{START}$ is 1. If the determination is NO, that is, if the starting control flag $F_{START}$ is set to zero, ECU 100 performs the following control for the normal operation.

In Step S32, ECU 100 reads various signals, such as the depression amount a of the gas pedal (i.e., gas-pedal opening). Then, in Step S33, ECU 100 calculates the target torque $TQ_D$ based on the read depression amount a, engine speed $N_{ENG}$, and vehicle speed VSP. Then, in Step S34, ECU 100 calculates the target air filling amount $CE_D$, fuel injection amount FP, and ignition timing SA based on the calculated target torque $TQ_D$ and engine speed $N_{ENG}$.

Next, in Step S35, ECU 100 calculates a target control value $\theta_{VVL\_D}$ of the VVL 33 based on the target air filling amount $CE_D$ and engine speed $N_{ENG}$. As shown in FIG. 7, the target value $\theta_{VVL\_D}$ is set so as to be greater as the target air filling amount $CE_D$ and engine speed $N_{ENG}$ increase.

Next, in Step S36, ECU 100 calculates a control value $\theta_{VCT\_D}$ of the VCT 32 (i.e., a target phase of the air-intake valve 21) based on the target air filling amount $CE_D$ and the engine speed $N_{ENG}$. As shown in FIG. 7, the target value $\theta_{VCT\_D}$ of the VCT 32 is set so as to be greater as the target air filling amount $CE_D$ and engine speed $N_{ENG}$ increase, and the valve timing of the air-intake valve 21 is controlled toward the retard side as those values increase.

Next, in Step S37, ECU 100 calculates a target value $TVO_D$ of the throttle valve 57 based on the target air filling amount $CE_D$ and engine speed $N_{ENG}$.

After each target value is calculated, ECU 100 proceeds to Step S38, and then drives each actuator based on each of the calculated target values. More specifically, the signal $\theta_{VVL\_D}$ is outputted to the stepping motor 123 of the VVL 33, and the stepping motor 123 operates so that a valve curve of the air-intake valve 21 becomes a curve corresponding to $\theta_{VVL\_D}$. The signal $\theta_{VCT\_D}$ is outputted to VCT 32 and, thus, VCT 32 operates so that a phase with respect to the crankshaft 14 of the air-intake cam shaft 31 becomes a value corresponding to $\theta_{VCT\_D}$. The signal FP is outputted to the fuel system 54 and, thus, an amount of the fuel corresponding to FP per a cylinder cycle is injected from the fuel injection valve 53. The signal SA is outputted to the ignition system 52 and, thus, the spark plug 51 ignites at a timing corresponding to SA within the cylinder cycle to ignite the air-fuel mixture inside the combustion chamber 17. As such, by igniting the air-fuel mixture that is constituted with required amount of air and fuel to burn at an appropriate timing, an output torque required for the engine body 1 can be generated from the crankshaft 14.

Figure 8:
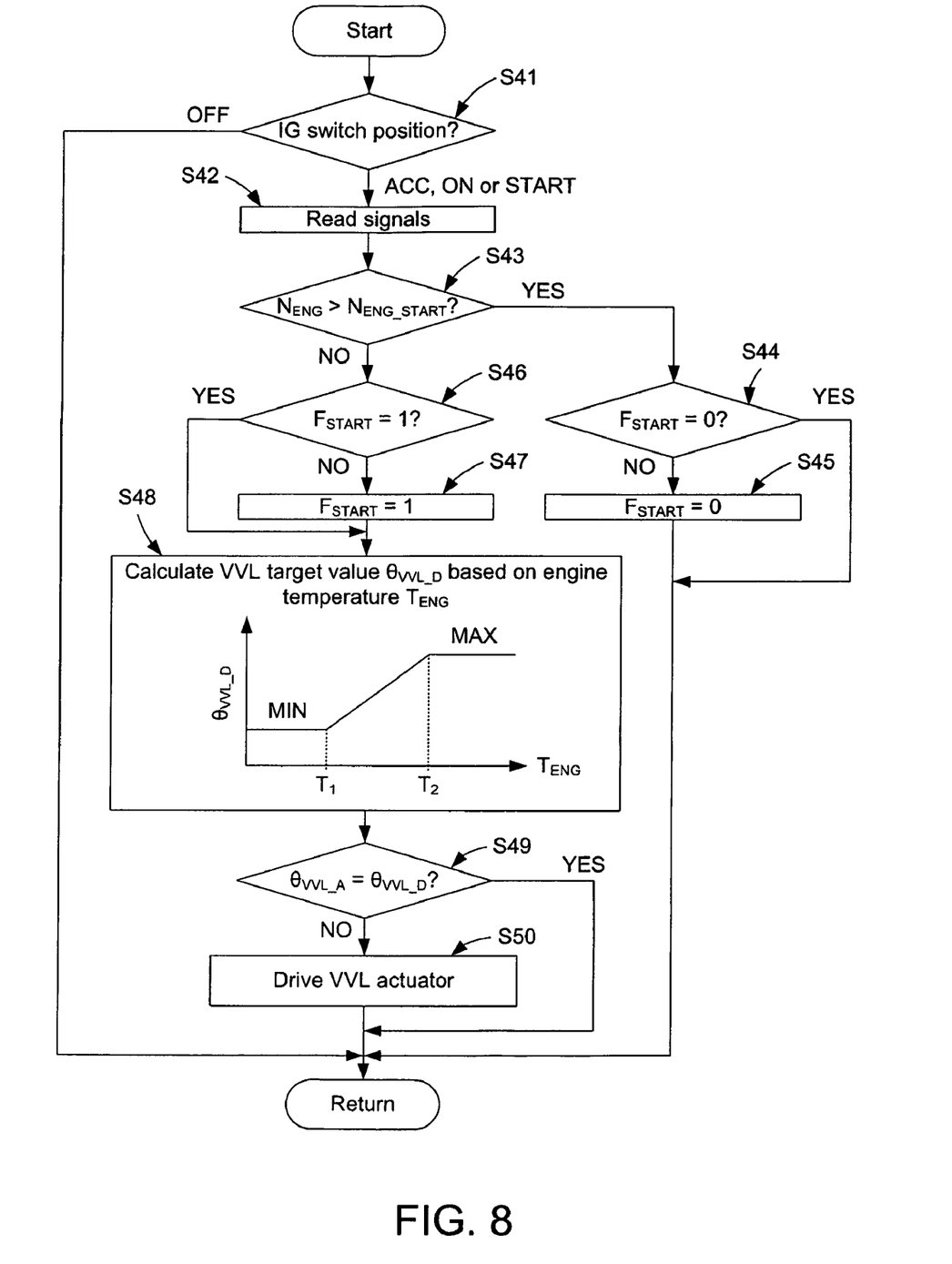
FIG. 8 is a flowchart showing a control routine according to the second embodiment to be executed when the engine is stopped.

On the other hand, if the determination in Step S31 is YES, that is, if the starting control flag $F_{START}=1$, then, in Step S100, ECU 100 drives the actuators, such as the VVL actuator 123, fuel system 54, and throttle actuator 58 based on the VVL target value $\theta_{VVL\_D}$ for engine start that is determined by the control routine shown in FIG. 8, the ignition timing SA for engine start that is set in advance, and the target value $TVO_D$ of throttle valve 57.

At the time of engine stop, because the gas-pedal opening α is zero (or below a minimum threshold), the target torque $TQ_D$ and the target air filling amount $CE_D$ become their minimum values in Steps S33 and S34. Therefore, in subsequent Steps S35 and S36, the VVL target values $\theta VVL\_D$ and $\theta_{VCT\_D}$ become the minimum values. As a result, in Step S38, ECU 100 controls the VCT actuator 116 so that the phase of the air-intake valve 21 advances most, and controls the stepping motor 123 so that the lift amount of the air-intake valve 21 reaches the minimum lift amount. More specifically, ECU 100 controls so that the lift curve of the air-intake valve 21 becomes as L3 in FIG. 4.

As such, according to the present control method, by making the lift amount of the air-intake valve 21 the minimum lift amount at the time of engine stop, breakage of the oil film as a result of VVL 33 applying a large load to the valve spring can be avoided. Next, a control routine mainly executed at the time of engine start (i.e., when Step 100 in FIG. 7 is performed) will be explained referring to a flowchart of FIG. 8.

First, in Step S41, ECU 100 returns if an ignition (IG) switch position is at OFF, and stands by until the IG switch is set to positions other than OFF (i.e., ACC, ON, or START). If the IG switch position is other than OFF, ECU 100 proceeds to Step S42, and then reads various signals, such as various sensor detection values. Then, ECU 100 proceeds to Step S43, and determines whether the value of the engine speed $N_{ENG}$ is larger than a starting engine speed $N_{ENG\_START}$ that is set in advance. If this determination is YES (that is, if ECU 100 determines that the engine speed $N_{ENG}$ is large enough), in Steps S44 and S45, ECU 100 sets the starting control flag $F_{START}$ to zero because the engine start has been completed, and the engine 1 is under normal operation. Then, ECU 100 returns to the main routine by executing Step S31 and the following in FIG. 7.

On the other hand, if the determination in Step S43 is NO, in Steps S46 and 47, ECU 100 sets the starting control flag $F_{START}$ to "1" because the engine speed is low and the engine start has not been completed.

Then, ECU 100 proceeds to Step S48, and sets the target operation value $\theta_{VVL\_D}$ of the VVL mechanism 33 according to the engine coolant temperature $T_{ENG}$ (i.e., the engine temperature) detected by the temperature sensor 77. More specifically, as shown in FIG. 8, if the engine temperature $T_{ENG}$ is at a high temperature greater than $T_2$, ECU 100 sets the target value $\theta_{VVL\_D}$ to the maximum lift amount, and if the engine temperature $T_{ENG}$ is less than $T_1$ at the time of cold start, ECU 100 sets the target value $\theta_{VVL\_D}$ to the minimum lift amount. If the engine temperature $T_{ENG}$ is between $T_1$ and $T_2$, ECU 100 increases the target value $\theta_{VVL\_D}$ in proportion to the increase in the engine temperature $T_{ENG}$ between the maximum and minimum lift amounts. In this embodiment, $T_1$ is 40 degrees C., and $T_2$ is 80 degrees C.

According to this method, the lift amount of the air-intake valve 21 is controlled to a more appropriate value in accordance with the engine temperature $T_{ENG}$ that is approximately proportional to the temperature inside the cylinder 11. Therefore, the engine start may be improved by making the air filling amount inside the cylinder 11 a more appropriate amount, while controlling the pre-ignition in each condition.

After Step S48, the routine proceeds to Step S49 and determines whether or not an actual VVL control amount $\theta_{VVL\_A}$ is equal to the target VVL control amount $\theta_{VVL\_D}$. If it is determined at Step S49 that the actual VVL control amount $\theta_{VVL\_A}$ is not equal to the target VVL control amount $\theta_{VVL\_D}$ (NO), the routine proceeds to Step S50 and the ECU 100 drives the VVL actuator 123. Then, the routine returns. If it is determined at Step S49 that the actual VVL control amount $\theta_{VVL\_A}$ is equal to the target VVL control amount $\theta_{VVL\_D}$ (YES), the routine passes Step S50 and returns. Therefore, the ECU 100 keeps driving the VVL actuator 123 until the actual VVL control amount $\theta_{VVL\_A}$ becomes equal to the target VVL control amount $\theta_{VVL\_D}$.

In this embodiment, the target value $\theta_{VVL\_D}$ of the VVL 33 at the time of high-temperature engine start may not be limited to the maximum lift amount, as described above. However, if the target value $\theta_{VVL\_D}$ is the maximum lift amount, and the valve-close timing of the air-intake valve 21 at the time of high-temperature engine start is controlled to the most retarded timing, an effective compression ratio may be reduced more certainly to avoid the occurrence of pre-ignition.

Further, VCT 32 and VVL 33 are not limited to those with the specific configuration as described above. They may have any configuration as long as the difference between the opening timings of the intake valve 21 at low and high temperature engine starts is smaller than the difference between the closing timings of the intake valve 21 at low and high temperature engine starts.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of controlling an internal combustion engine having an intake valve capable of shutting off a cylinder from an intake air passage of said internal combustion engine, the method comprising:
    detecting a temperature of said internal combustion engine prior to starting the engine,
    starting the engine while opening and closing said intake valve respectively at first opening and closing timings of a cylinder cycle when the detected temperature is below a predetermined temperature, and
    starting the engine while opening and closing said intake valve respectively at second opening and closing timings of a cylinder cycle when the detected temperature is above said predetermined temperature, said second closing timing being later than said first closing timing and after a bottom dead center of an intake stroke of the cylinder cycle, said second opening timing being earlier than said first opening timing, a difference between said first and second closing timings being greater than a difference between said first and second opening timings.

2. The method as described in claim 1, wherein a maximum lift of said intake valve during the engine start when the temperature of said internal combustion engine is above the predetermined temperature is greater than that when the temperature of said internal combustion engine is below the predetermined temperature.

3. The method as described in claim 1, wherein said second closing timing retards in the cylinder cycle as the temperature of said internal combustion engine is increased.

4. The method as described in claim 1, wherein said first opening timing is after a top dead center of the intake stroke in the cylinder cycle.

5. A method of controlling an engine system comprising an internal combustion engine having an intake air passage, a combustion chamber and an intake valve which reciprocally moves synchronously with a rotational phase of a crankshaft of said internal combustion engine and thereby opens and closes said intake air passage to and from said combustion chamber and a variable lift mechanism capable of varying a lift characteristic of said intake valve with respect to said rotational phase of the crankshaft, the method comprising:
    detecting a temperature of said internal combustion engine prior to starting the engine,
    controlling said variable valve lift mechanism so that said intake valve opens and closes respectively at first opening and closing timings of a cylinder cycle when starting the engine when the detected temperature of the engine is below a predetermined temperature, and
    controlling said variable valve lift mechanism so that said intake valve opens and closes respectively at second opening and closing timings of a cylinder cycle engine start when starting the engine when the detected temperature of the engine is above said predetermined temperature, said second closing timing being later than said first closing timing and a bottom dead center of an intake stroke of the cylinder cycle, said second opening timing being earlier than said first opening timing, a difference between said first and second closing timings being greater than a difference between said first and second opening timings.

6. The method of claim 5, further comprising driving said variable lift mechanism before cranking said internal combustion engine for the engine start.

7. The method of claim 6, further comprising detecting an operation of an ignition switch of a vehicle equipped with said engine system, and wherein said variable lift mechanism is driven upon detecting said operation of said ignition switch.

8. The method of claim 7, wherein said operation of said ignition switch is detected when an ignition key is inserted into a key cylinder of said ignition switch.

9. The method of claim 7, wherein said operation of said ignition switch is detected when the ignition key which is in the key cylinder of said ignition switch is turned.

10. The method of claim 5, further comprising controlling said variable valve lift mechanism during an engine stop so that a closing timing of said intake valve during an engine rotation is earliest in the cylinder cycle.

11. The method as described in claim 5, wherein a maximum lift of said intake valve during the engine start when the temperature of said internal combustion engine is above the predetermined temperature is greater than that when the temperature of said internal combustion engine is below the predetermined temperature.

12. The method of claim 5, wherein a valve lift is maximum when said intake valve opens and closes respectively at said second opening and closing timings.

13. The method of claim 5, wherein said second closing timing retards in the cylinder cycle as the temperature of said internal combustion engine is increased.

14. The method of claim 5, wherein said first opening timing is after a top dead center of the intake stroke in the cylinder cycle.

15. An engine system comprising:
    an internal combustion engine having an intake air passage, a combustion chamber and an intake valve which reciprocally moves synchronously with a rotational phase of a crankshaft of said internal combustion engine and thereby opens and closes said intake air passage to and from said combustion chamber;
    a variable valve lift mechanism capable of varying a lift characteristic of said intake valve with respect to said rotational phase of the crankshaft;
    detecting a temperature of said internal combustion engine prior to starting the engine, and
    a controller which controls said variable valve lift mechanism so that said intake valve opens and closes respectively at first opening and closing timings when starting the engine when the detected temperature of the engine is below a predetermined temperature and at second opening and closing timings when starting the engine when the detected temperature of the engine is above said predetermined temperature, said second closing timing being later than said first closing timing and a bottom dead center of an intake stroke of a cylinder cycle, said second opening timing being earlier than said first opening timing, a difference between said first and second closing timings being greater than a difference between said first and second opening timings.

16. The system of claim 15, wherein said variable valve lift mechanism comprises an electric motor, and wherein said electric motor is driven before cranking said internal combustion engine for the engine start.

17. The system of claim 16, further comprising an ignition switch which is operable by an operator of said internal combustion engine to start an operation of said internal combustion engine, and wherein said electric motor is driven when said ignition switch is operated.

18. The system of claim 16, further comprising a variable valve timing mechanism which has a hydraulic actuator and is capable of varying an operational phase of said intake valve with respect to the rotational phase of said crankshaft, and wherein said variable valve timing mechanism is not operated during the engine start.

19. The system of claim 18, wherein said variable valve timing mechanism comprises a spring which urges the operational phase of said intake valve toward a retarded side.

20. The system of claim 15, wherein said internal combustion engine has a geometric compression ratio of 13:1 or greater.

* * * * *